US009743493B2

(12) United States Patent
Maros et al.

(10) Patent No.: US 9,743,493 B2
(45) Date of Patent: Aug. 22, 2017

(54) METHODS, APPARATUS, SYSTEM AND MEDIA FOR USE IN ASSOCIATION WITH LIGHTING SYSTEMS

(71) Applicant: GENERAL ELECTRIC COMPANY, Schenectady, NY (US)

(72) Inventors: István Maros, BudaPest (HU); Gábor Törös, BudaPest (HU); Roland Bátai, BudaPest (HU); Ténia Alexandra Kovács, BudaPest (HU); Gabor Schmidt, BudaPest (HU)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/964,107

(22) Filed: Dec. 9, 2015

(65) Prior Publication Data

US 2017/0171942 A1 Jun. 15, 2017

(51) Int. Cl.
*H05B 37/02* (2006.01)
*F21S 8/08* (2006.01)
*G05B 15/02* (2006.01)

(52) U.S. Cl.
CPC .......... *H05B 37/0227* (2013.01); *F21S 8/086* (2013.01); *G05B 15/02* (2013.01)

(58) Field of Classification Search
CPC ...... H05B 37/0227; F21S 8/086; G05B 15/02
USPC ....................................................... 315/297
See application file for complete search history.

(56) References Cited

U.S. PATENT DOCUMENTS

| 3,893,000 | A * | 7/1975 | Guercio | G08G 1/09 |
| | | | | 315/155 |
| 6,608,453 | B2 * | 8/2003 | Morgan | G09G 3/14 |
| | | | | 315/297 |
| 7,636,630 | B2 * | 12/2009 | Fushiki | G01C 21/26 |
| | | | | 340/905 |
| 8,427,076 | B2 * | 4/2013 | Bourquin | H05B 37/0227 |
| | | | | 315/149 |
| 8,872,432 | B2 | 10/2014 | Kercso et al. | |
| 8,933,642 | B2 | 1/2015 | Ghanem | |
| 8,981,671 | B2 * | 3/2015 | Karasawa | H05B 37/0272 |
| | | | | 315/297 |

(Continued)

FOREIGN PATENT DOCUMENTS

| CA | 2444734 A1 | 10/2002 |
| CN | 101545616 A | 9/2009 |

(Continued)

*Primary Examiner* — Dylan White
(74) *Attorney, Agent, or Firm* — GE Global Patent Operation; Peter T. DiMauro

(57) ABSTRACT

In an aspect, a controller is configured to: receive traffic information; determine a characterization based at least in part on a portion of the traffic information that is associated with traffic from days prior to a current day; determine whether the characterization that is based at least in part on the portion of the traffic information associated with traffic from days prior to the current day satisfies a criteria; provide on the current day, an output based at least in part thereon; determine a characterization based at least in part on a portion of the traffic information that is associated with traffic from the current day; determine whether the characterization that is based at least in part on the portion of the traffic information associated with traffic from the current day satisfies a criteria; and provide on the current day, an output based at least in part thereon.

19 Claims, 12 Drawing Sheets

(56) References Cited

U.S. PATENT DOCUMENTS

| | | | |
|---|---|---|---|
| 9,119,243 B2 * | 8/2015 | Van Zeijl | H05B 37/0227 |
| 9,386,664 B2 * | 7/2016 | Knibbe | H05B 37/0227 |
| 9,437,109 B1 * | 9/2016 | Stafford | F21L 4/02 |
| 2007/0208494 A1 * | 9/2007 | Chapman | G08G 1/0104 701/117 |
| 2007/0208498 A1 * | 9/2007 | Barker | G08G 1/0104 701/117 |
| 2008/0273333 A1 * | 11/2008 | Berns | F21S 8/083 362/294 |
| 2010/0001652 A1 * | 1/2010 | Damsleth | H05B 37/0227 315/149 |
| 2011/0106416 A1 * | 5/2011 | Scofield | G08G 1/0104 701/119 |
| 2013/0241415 A1 | 9/2013 | Arik et al. | |
| 2014/0320025 A1 * | 10/2014 | Assoulin | H05B 37/0227 315/154 |
| 2015/0115802 A1 | 4/2015 | Kuti et al. | |
| 2015/0137703 A1 | 5/2015 | Hartman et al. | |

FOREIGN PATENT DOCUMENTS

| | | | | |
|---|---|---|---|---|
| EP | 2533613 A1 | 12/2012 | | |
| ES | 2360774 B1 | 4/2012 | | |
| FI | EP 2320713 A2 * | 5/2011 | | H05B 37/0254 |
| FI | EP 2375872 A2 * | 10/2011 | | H05B 37/0227 |
| GB | 2444734 A * | 6/2008 | | H05B 37/0227 |
| WO | WO 2011113022 A1 * | 9/2011 | | G01C 21/3492 |
| WO | 2013093914 A1 | 6/2013 | | |

* cited by examiner

| TIME OR TIME INTERVAL # | DAY | | | | | | | | |
|---|---|---|---|---|---|---|---|---|---|
| ✕ | 1 | 2 | 3 | 4 | 5 | 6 | ... | n-1 | n |
| 1 | $d_{1,1}$ | $d_{1,2}$ | $d_{1,3}$ | $d_{1,4}$ | $d_{1,5}$ | $d_{1,6}$ | ... | $d_{1,n-1}$ | $d_{1,n}$ |
| 2 | $d_{2,1}$ | $d_{2,2}$ | $d_{2,3}$ | $d_{2,4}$ | $d_{2,5}$ | $d_{2,6}$ | ... | $d_{2,n-1}$ | $d_{2,n}$ |
| 3 | $d_{3,1}$ | $d_{3,2}$ | $d_{3,3}$ | $d_{3,4}$ | $d_{3,5}$ | $d_{3,6}$ | ... | $d_{3,n-1}$ | $d_{3,n}$ |
| 4 | $d_{4,1}$ | $d_{4,2}$ | $d_{4,3}$ | $d_{4,4}$ | $d_{4,5}$ | $d_{4,6}$ | ... | $d_{4,n-1}$ | $d_{4,n}$ |
| 5 | $d_{5,1}$ | $d_{5,2}$ | $d_{5,3}$ | $d_{5,4}$ | $d_{5,5}$ | $d_{5,6}$ | ... | $d_{5,n-1}$ | $d_{5,n}$ |
| 6 | $d_{6,1}$ | $d_{6,2}$ | $d_{6,3}$ | $d_{6,4}$ | $d_{6,5}$ | $d_{6,6}$ | ... | $d_{6,n-1}$ | $d_{6,n}$ |
| 7 | $d_{7,1}$ | $d_{7,2}$ | $d_{7,3}$ | $d_{7,4}$ | $d_{7,5}$ | $d_{7,6}$ | ... | $d_{7,n-1}$ | $d_{7,n}$ |
| 8 | $d_{8,1}$ | $d_{8,2}$ | $d_{8,3}$ | $d_{8,4}$ | $d_{8,5}$ | $d_{8,6}$ | ... | $d_{8,n-1}$ | $d_{8,n}$ |
| 9 | $d_{9,1}$ | $d_{9,2}$ | $d_{9,3}$ | $d_{9,4}$ | $d_{9,5}$ | $d_{9,6}$ | ... | $d_{9,n-1}$ | $d_{9,n}$ |
| ⋮ | ⋮ | ⋮ | ⋮ | ⋮ | ⋮ | ⋮ | ... | ⋮ | ⋮ |
| m-1 | $d_{m-1,1}$ | $d_{m-1,2}$ | $d_{m-1,3}$ | $d_{m-1,4}$ | $d_{m-1,5}$ | $d_{m-1,6}$ | ... | $d_{m-1,n-1}$ | $d_{m-1,n}$ |
| m | $d_{m,1}$ | $d_{m,2}$ | $d_{m,3}$ | $d_{m,4}$ | $d_{m,5}$ | $d_{m,6}$ | ... | $d_{m,n-1}$ | |

*FIG. 4*

| TIME OR TIME INTERVAL # | CHARACTERIZATION |
|---|---|
| 1 | $S_1$ |
| 2 | $S_2$ |
| 3 | $S_3$ |
| 4 | $S_4$ |
| 5 | $S_5$ |
| 6 | $S_6$ |
| 7 | $S_7$ |
| 8 | $S_8$ |
| 9 | $S_9$ |
| ⋮ | ⋮ |
| m-1 | $S_{m-1}$ |
| m | $S_m$ |

METHODS, APPARATUS, SYSTEM AND MEDIA FOR USE IN ASSOCIATION WITH LIGHTING SYSTEMS

FIELD

Embodiments of the present disclosure relate generally to methods and apparatus for use in association with lighting systems. More particularly, embodiments of the present disclosure relate generally to methods and apparatus for use in association with lighting systems in association with traffic sensing.

BACKGROUND

It is often desirable to control the amount of lighting in an area (e.g., roads, buildings) in order to conserve energy.

Some systems control the amount of lighting based on historical traffic statistics, i.e., increasing lighting during times that are historically busy (e.g., evening rush hours) and reducing lighting during times that are historically not busy (i.e., non-rush hours).

Some systems control the amount of lighting by reducing lighting unless motion sensors detect the presence of traffic (e.g., vehicle).

BRIEF DESCRIPTION

Many drivers (and/or pedestrians) feel most comfortable and secure when provided with constant/full lighting.

However, providing constant/full lighting at all times would thwart the desire to reduce energy costs.

It has been determined that it is possible to address the preference of many drivers (and/or pedestrians), to at least some degree, while conserving energy, by controlling lighting at one or more times on a current day based at least in part on historical traffic information and by controlling lighting at one or more times on a current day based at least in part on current day traffic information.

In some embodiments, increased lighting may be provided at times that are historically busy (e.g., evening rush hours), even if such times are not busy on the current day, and at one or more times that are busy on the current day, even if they are not historically busy (i.e., non-rush hours).

The providing of increased lighting at times that are historically busy (e.g., evening rush hours), even if such times are not busy on the current day, is sometimes referred to herein as a continuous mode.

The providing of increased lighting at one or more times that are busy on the current day, even if they are not historically busy (i.e., non-rush hours), is sometimes referred to herein as an adaptive mode.

In some embodiments, the providing of increased lighting at one or more times on the current day has the added benefit of further enhancing safety.

In a first aspect, an apparatus comprises a controller configured to: receive traffic information. The controller is further configured to: determine a first characterization based at least in part on a portion of the traffic information that is associated with traffic from days prior to a current day; determine whether the first characterization that is based at least in part on the portion of the traffic information associated with traffic from days prior to the current day satisfies a first criteria; and provide at a time on the current day, a first output, based at least in part on a result of the determination as to whether the first characterization that is based at least in part on the portion of the traffic information associated with traffic from days prior to the current day satisfies the first criteria. The controller is further configured to: determine a second characterization based at least in part on a portion of the traffic information that is associated with traffic from the current day; determine whether the second characterization that is based at least in part on the portion of the traffic information associated with traffic from the current day satisfies a second criteria; and provide at a time on the current day, a second output, based at least in part on a result of the determination as to whether the second characterization that is based at least in part on the portion of the traffic information associated with traffic from the current day satisfies the second criteria.

In some embodiments, the providing of a first output, based at least in part on a result of the determination as to whether the first characterization that is based at least in part on the portion of the traffic information associated with traffic from days prior to the current day satisfies the first criteria comprises: provide a first output, based at least in part on a result of the determination as to whether the first characterization satisfies the first criteria, to cause, at least in part, a lighting system to provide a first amount of illumination at a first time on the current day. The providing of a second output, based at least in part on a result of the determination as to whether the second characterization that is based at least in part on the portion of the traffic information associated with traffic from the current day satisfies the second criteria comprises: provide a second output, based at least in part on a result of the determination as to whether the second characterization satisfies the second criteria, to cause, at least in part, the lighting system to provide a second amount of illumination at a second time on the current day.

In some embodiments, the controller is further configured to: provide a third output, to cause, at least in part, the lighting system to provide a third amount of illumination that is less than the first amount of illumination and less than the second amount of illumination at a third time on the current day.

In some embodiments, the first characterization is based at least in part on: (i) a portion of the traffic information that is associated with traffic from days prior to a current day, and (ii) a portion of the traffic information that is associated with traffic from the current day. The second characterization is based at least in part on: (i) a portion of the traffic information that is associated with traffic from days prior to a current day, and (ii) a portion of the traffic information that is associated with traffic from the current day.

In some embodiments, the first characterization is determined as a weighted sum and the second characterization is determined as a weighted sum.

In a second aspect, a system includes the apparatus and the lighting system.

In some embodiments, the system further includes a traffic sensor to provide the traffic information.

In a third aspect, a method comprises: receiving, in a controller, traffic information; determining, by the controller, a first characterization based at least in part on a portion of the traffic information that is associated with traffic from days prior to a current day; determining, by the controller, whether the first characterization that is based at least in part on the portion of the traffic information associated with traffic from days prior to the current day satisfies a first criteria; providing, by the controller, at a time on the current day, a first output, based at least in part on a result of the determination as to whether the first characterization that is based at least in part on the portion of the traffic information associated with traffic from days prior to the current day satisfies the first criteria; determining, by the controller, a second characterization based at least in part on a portion of the traffic information that is associated with traffic from the current day; determining, by the controller, whether the second characterization that is based at least in part on the portion of the traffic information associated with traffic from the current day satisfies a second criteria; and providing, by the controller, at a time on the current day, a second output, based at least in part on a result of the determination as to whether the second characterization that is based at least in part on the portion of the traffic information associated with traffic from the current day satisfies the second criteria.

In a fourth aspect, a non-transitory computer readable storage medium has code stored thereon. The code is executable by a processor to result in a method comprising: receiving, in a controller, traffic information; determining, by the controller, a first characterization based at least in part on a portion of the traffic information that is associated with traffic from days prior to a current day; determining, by the controller, whether the first characterization that is based at least in part on the portion of the traffic information associated with traffic from days prior to the current day satisfies a first criteria; providing, by the controller, at a time on the current day, a first output, based at least in part on a result of the determination as to whether the first characterization that is based at least in part on the portion of the traffic information associated with traffic from days prior to the current day satisfies the first criteria; determining, by the controller, a second characterization based at least in part on a portion of the traffic information that is associated with traffic from the current day; determining, by the controller, whether the second characterization that is based at least in part on the portion of the traffic information associated with traffic from the current day satisfies a second criteria; and providing, by the controller, at a time on the current day, a second output, based at least in part on a result of the determination as to whether the second characterization that is based at least in part on the portion of the traffic information associated with traffic from the current day satisfies the second criteria.

BRIEF DESCRIPTION OF THE DRAWINGS

FIG. 4 is a graphical representation of traffic densities, in accordance with some embodiments.

FIG. 6 is a graphical representation of characterizations in the form of weighted sums, in accordance with some embodiments.

DETAILED DESCRIPTION

Some aspects of this disclosure are directed to a system, a controller, a fixture, a method and/or a medium for use in controlling lighting in an area.

Figure 1:
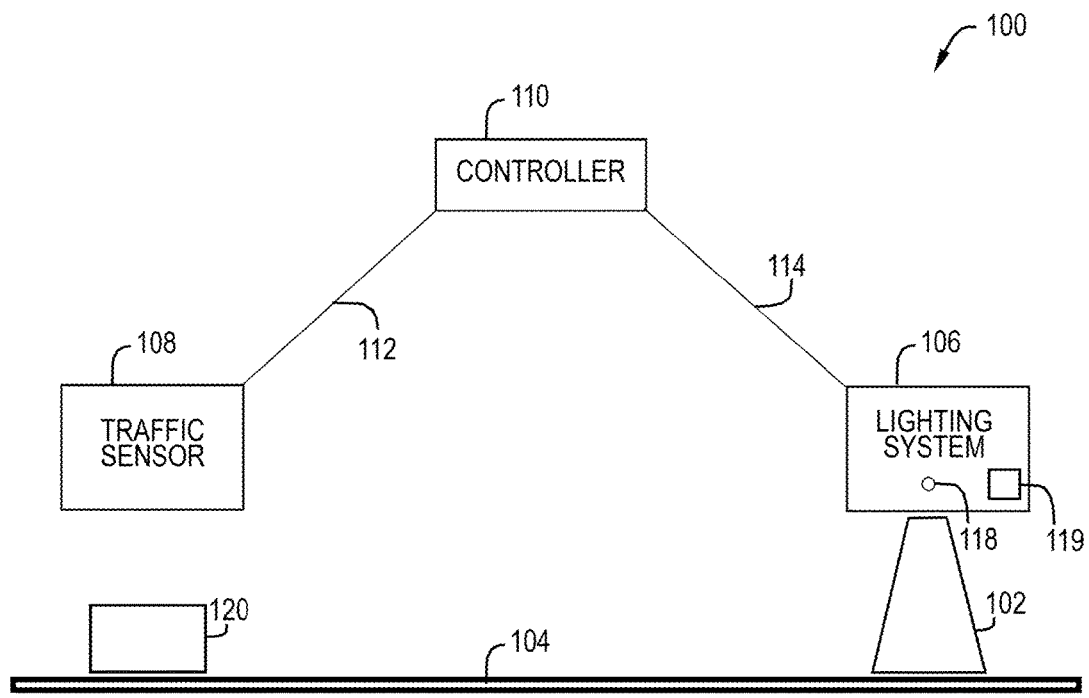
FIG. 1 is a block diagram of a system, in accordance with some embodiments.

FIG. 1 is a block diagram of a system 100 that provides illumination in an area 102, e.g., a portion of a street 104, in accordance with some embodiments.

Referring to FIG. 1, in accordance with some embodiments, the system 100 includes a lighting system 106, a traffic sensor 108 and a controller 110. The system 100 further includes one or more links, e.g., links 112-114, that couple the lighting system 106, the traffic sensor 108 and the controller 110 to one another. As used herein, the term "couple" means "couple directly" and/or "couple indirectly".

The lighting system 106 includes a light source 116, which may include one or more light emitting diodes (LEDs), e.g., LED 118, and/or any other source(s) of light. In some embodiments, the light source 116 comprises white LEDs and/or LED arrays that combine white and red LEDs. In some embodiments, the light source 116 comprises fluorescent tubes and/or a combination of fluorescent tubes and LEDs. In some embodiments, one or more of the source(s) of light is an "instant on" type of light source.

The lighting system 106 may further include drive circuitry 119 coupled between the light source 116 and a power source. The drive circuitry 119 may be configured to receive power from the power source and to supply power to the light source 116.

The traffic sensor 108 is configured to sense traffic and to provide data indicative thereof.

As used herein, the term "traffic" means motor vehicle traffic (e.g., cars and/or trucks) and/or non-motor vehicle traffic (i.e., traffic that is not motor vehicle traffic, e.g., pedestrians, bicyclists). Traffic may move in one or more directions, however, movement may or may not be at a constant rate and/or continuous.

As used herein, the phrase "indicative of" means "directly indicative of" and/or "indirectly indicative of". The phrase "indirectly indicative of" means "not directly indicative but sufficient to allow determination of".

In some embodiments, the traffic sensor 108 is configured to sense traffic entering, exiting and/or otherwise within (in whole and/or in part) a detection area 120, and to provide data indicative thereof.

As used herein, a "detection area" may have any configuration (e.g., size, shape). In some embodiments, a detection area may have multiple portions, which may or may not be contiguous with one another.

In some embodiments, the detection area 120 may be upstream (traffic wise) of, spaced apart from, adjacent to, and/or overlapping, the area 102 to be illuminated.

The data provided by the traffic sensor 108 may have any form(s). In some embodiments, the data may be in the form of a data stream that includes a time-stamped pulse and/or other indication for traffic events which are desired to be sensed (e.g., a vehicle enters, exits and/or is otherwise present in the detection area 120).

As used herein, a "data stream" may include any type(s) of data in any form(s) and may or may not include a continuous stream.

In some embodiments, each time-stamped pulse and/or other indication may be provided in real time after the event (e.g., a vehicle enters, exits and/or is otherwise present in the detection area 120) and/or within a period of time that is short enough to allow an opportunity for one or more response in accordance with one or more embodiments described herein.

The traffic sensor 108 may comprise any type(s) of traffic sensor(s). In some embodiments, the traffic sensor 108 includes one or more motion detectors, acoustic sensors, electromagnetic sensors, occupancy sensors, image processors, vehicle detection loops, air filled hoses and/or other type(s) of traffic sensor(s).

The controller 110 may be configured to receive traffic information and to provide an output, based at least in part thereon, to control, at least in part, an amount of lighting provided by the lighting system 106.

As used herein, the phrase "receive" means "receive directly" and/or "receive indirectly".

At used herein, the phrase "to control" means "to control directly" and/or "to control indirectly". The phrase "to control, at least in part" means "to control" and/or "to control in part" so as not to preclude the possibility that an output of the controller is not a sole control but rather only one contributing control.

The output provided by the controller 110 may have any form(s). In some embodiments, the output provided by the controller 110 may be in the form of one or more analog and/or digital signal(s). In some embodiments, one or more of the signal(s) may be in the form of a command in a standard protocol. In some embodiments, the output provided by the controller 110 may be in the form of power to drive the lighting system 106 or portion(s) thereof.

As stated above, it is often desirable to control the amount of lighting in an area (e.g., roads, buildings) in order to conserve energy.

However, many drivers (and/or pedestrians) feel most comfortable and secure when provided with constant/full lighting.

It has been determined that it is possible to address the preference of many drivers (and/or pedestrians), to at least some degree, while conserving energy, by controlling lighting at one or more times on a current day based at least in part on historical traffic information and by controlling lighting at one or more times on a current day based at least in part on current day traffic information.

In some embodiments, increased lighting may be provided at times that are historically busy (e.g., evening rush hours), even if such times are not busy on the current day, and at one or more times that are busy on the current day, even if they are not historically busy (i.e., non-rush hours).

The providing of increased lighting at times that are historically busy (e.g., evening rush hours), even if such times are not busy on the current day, is sometimes referred to herein as a continuous mode.

The providing of increased lighting at one or more times that are busy on the current day, even if they are not historically busy (i.e., non-rush hours), is sometimes referred to herein as an adaptive mode.

In some embodiments, the providing of increased lighting at one or more times on the current day has the added benefit of further enhancing safety.

Figure 2:
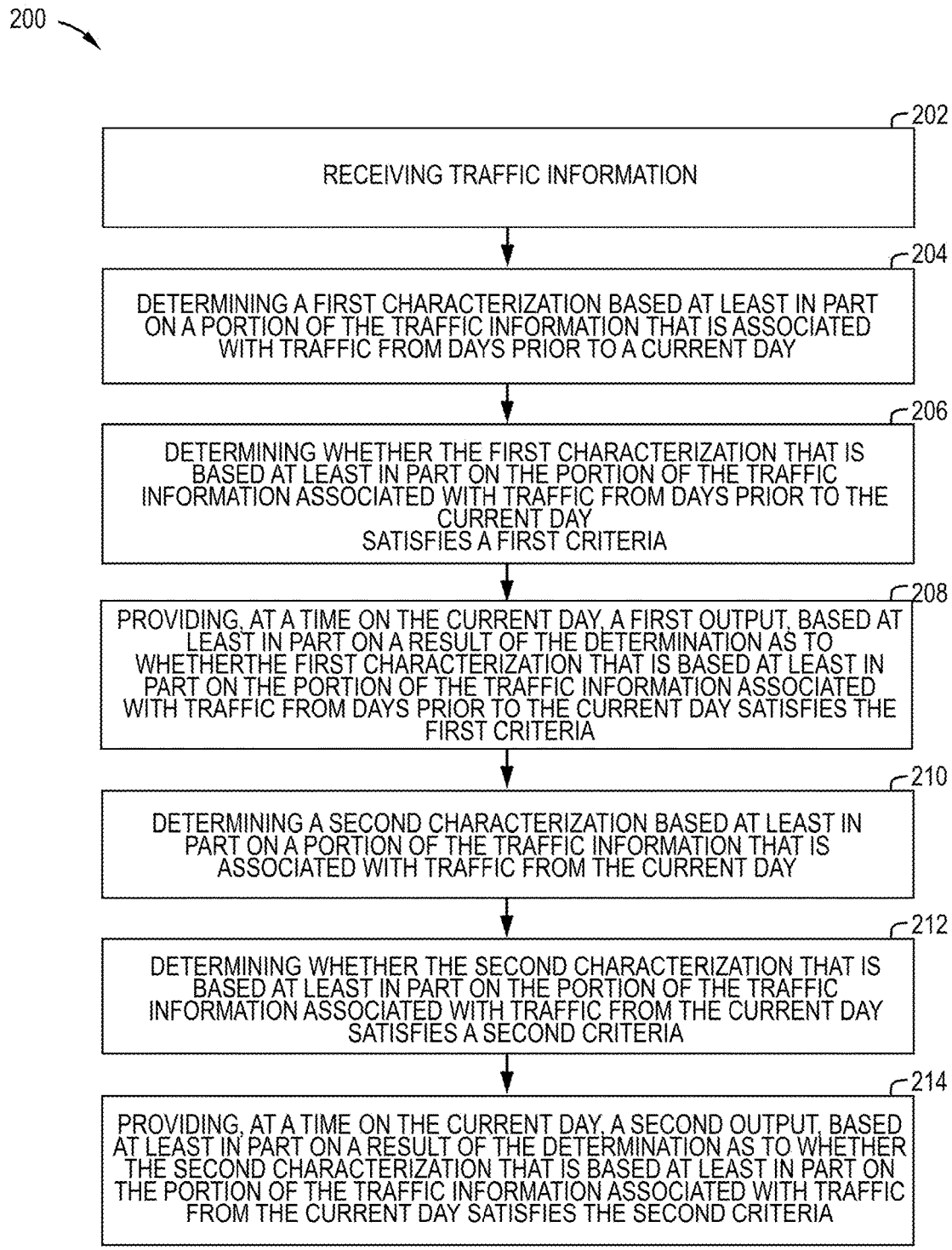
FIG. 2 is a flow chart of a method, in accordance with some embodiments.

FIG. 2 is a flow chart of a method 200, in accordance with some embodiments.

In accordance with some embodiments, the method may be used in controlling lighting in an area.

In some embodiments, the method 200 (and/or any other method disclosed herein) or one or more portions thereof, may be performed by the controller 110 and/or one or more other portion(s) of the system 100 or other processing system.

The method 200 is not limited to the order shown in the flow chart. Rather, embodiments of the method 200 may be performed in any order that is practicable. For that matter, unless stated otherwise, any method disclosed herein may be performed in any order that is practicable.

In some embodiments, a non-transitory computer readable medium may have instructions stored thereon, which if executed by a machine result in performance of the method 200 (and/or any other method disclosed herein) or one or more portions thereof.

Referring to FIG. 2, in accordance with some embodiments, at 202, the method may include receiving, in a controller, traffic information.

As used herein, the term "information" means data, in raw and/or any other form, and/or any other type of information.

The traffic information may have any form(s) and may be received in any manner(s), from any source(s), directly and/or indirectly, external and/or internal to, the processor.

In some embodiments, the traffic information is indicative of traffic that enters, exits and/or is otherwise present in a detection area that is upstream of, and/or overlaps one or more portions of, an area to be illuminated.

In some embodiments, the data may be in the form of a data stream that includes a time-stamped pulse and/or other indication for traffic events which are desired to be sensed (e.g., a vehicle enters, exits and/or is otherwise present in the detection area 120).

In some embodiments, each time-stamped pulse and/or other indication may be provided in real time after the event (e.g., a vehicle enters, exits and/or is otherwise present in the detection area 120) and/or within a period of time that is short enough to allow an opportunity for one or more response in accordance with one or more embodiments described herein.

Figure 3:
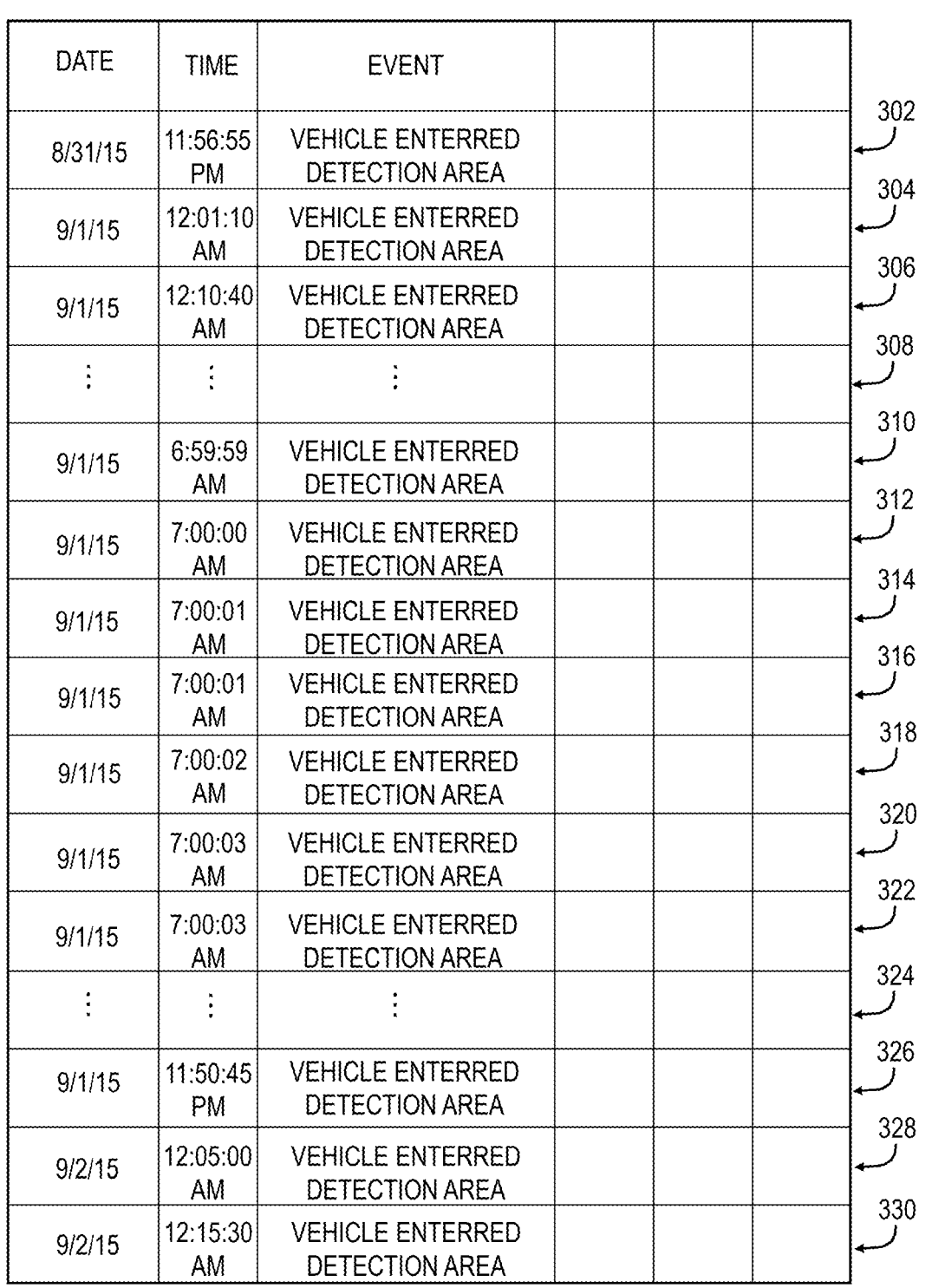
FIG. 3 is a graphical representation of traffic information, in accordance with some embodiments.

FIG. 3 is a graphical representation 300 of a portion of the traffic information that may be received at 202, in accordance with some embodiments.

Referring to FIG. 3, the graphical representation 300 includes a table having a plurality of time-stamped entries, e.g., entries 302-330.

Each time-stamped entry represents a single traffic event and identifies the traffic event, the date on which the traffic event occurred and the time of day at which the traffic event occurred.

For example, a first entry 302 in the table indicates that a vehicle entered the detection area at 11:56:55 PM on Aug. 31, 2015. A second entry 304 indicates that a vehicle entered the detection area at 12:01:10 AM on Sep. 1, 2015. A last entry 330 in the table indicates that a vehicle entered the detection area at 12:15:30 AM on Sep. 2, 2015.

In some embodiments, the information in each entry may be received in real time after the traffic event represented by the entry and/or within a period of time that is short enough to allow an opportunity for one or more response in accordance with one or more embodiments described herein.

For example, in some embodiments, the information in the first entry 302 may be received in real time after the vehicle entered the detection area at 11:56:55 PM on Aug. 31, 2015 and/or within a period of time that is short enough to allow an opportunity for one or more response in accordance with one or more embodiments described herein.

Traffic information associated with a current day is sometimes referred to herein as current day traffic information.

Traffic information associated with days prior to the current day is sometimes referred to herein as historical traffic information.

In some embodiments, the traffic information may be used in determining a traffic density for each of various times or time intervals on each of various days.

FIG. 4 is a graphical representation 400 of traffic densities that may be determined for various times or time intervals on each of various days, in accordance with some embodiments.

In some embodiments, each traffic density is determined as soon as or shortly after, the associated time or time interval passes.

Referring to FIG. 4, the graphical representation 400 includes a table with a plurality of rows and a plurality of columns. Each column is associated with a different day. Each row is associated with a different time and/or time interval.

An $n^{th}$ column is associated with a current day. Each of the other columns is associated with a respective day prior to the current day. For example, an $n\text{-}1^{th}$ column is associated with a day that was one day prior to the current day. An $n\text{-}2^{th}$ column is associated with a day that was two days prior to the current day. And so on.

Each column includes a plurality of traffic densities. Each traffic density in a column is associated with a respective time or time interval on the day associated with the column.

For example, column 1 includes traffic densities $d_{1,1}$ to $d_{m,1}$. The notation $d_{i,j}$ indicates that a traffic density is associated with an ith time or time interval on a jth day. Thus, the traffic density $d_{1,1}$ in column 1 is associated with time or time interval 1 on day 1. The traffic density $d_{2,1}$ in column 1 is associated with time or time interval 2 on day 1. The pattern developed by the foregoing sequence may repeat.

From another perspective, each row also includes a plurality of traffic densities. Each traffic density in a row is associated with a same time or time interval (the time or time interval associated with the row) on a respective one of the days. For example, row 1 includes traffic densities $d_{1,1}$ to $d_{1,n}$. The traffic density $d_{1,1}$ in row 1 is associated with time or time interval 1 on day 1. The traffic density $d_{1,2}$ in row 1 is associated with time or time interval 1 on day 2. And so on.

It can be seen that a traffic density has already been determined for all but a final time or time interval on the current day. Thus, the next traffic density to be determined is $d_{m,n}$.

Since the $n^{th}$ column is associated with the current day, each traffic density in the $n^{th}$ column is sometimes referred to herein as a current day traffic density.

Since the remaining columns (column 1 to column n-1) are associated with days prior to the current day, each traffic density in a remaining column is sometimes referred to herein as a historical traffic density.

Referring again to FIG. 2, at 204, the method may further include determining, by controller, a first characterization based at least in part on a portion of the traffic information that is associated with traffic from days prior to a current day.

In some embodiments, such portion of the traffic information may comprise traffic data indicative of traffic from days prior to the current day.

In some embodiments, the first characterization may comprise a value determined based at least in part on a relevant time or time interval of such data.

In some embodiments, the relevant time or time interval may be a time or time interval corresponding to a time of day for which the first characterization is being determined.

For example, referring again to FIG. 4, if the time of day is within time interval 1, the relevant time or time interval may be time interval 1 and the first characterization may be determined based at least in part on one or more of the historical traffic densities, $d_{1,1}$ to $d_{1,n-1}$, associated with time interval 1.

In some embodiments, the first characterization may be determined as an average (weighted or non-weighted) of the historical traffic densities for the relevant time or time interval.

For example, referring again to FIG. 4, if the time of day is within time interval 1, the relevant time or time interval may be time interval 1 and the first characterization may be determined as an average of historical traffic densities, e.g., $d_{1,1}$ to $d_{1,n-1}$, associated with time interval 1.

As will be further described herein with respect to FIGS. 6-9, in some embodiments, the first characterization may be determined based at least in part on both: (i) a portion of the traffic information that is associated with traffic from days prior to a current day, and (ii) a portion of the traffic information that is associated with traffic from the current day.

In some of the latter embodiments, the first characterization may be determined as a weighted sum of: (i) historical traffic densities for a relevant time or time interval and (ii) a current day traffic density for the relevant time or time interval.

In some embodiments, the relevant time or time interval may be a time or time interval corresponding to a time of day for which the first characterization is being determined.

At 206, the method may further include determining, by the controller, whether the first characterization that is based at least in part on the portion of the traffic information associated with traffic from days prior to a current day satisfies a first criteria.

In some embodiments, the above may comprise determining whether a value and/or other type of first characterization satisfies a first threshold and/or any other type of criteria.

A determination as to whether a value satisfies a threshold may depend on the type of value and/or the type of threshold. In some embodiments, a value may satisfy a threshold only if the value is greater than the threshold. In some other embodiments, a value may satisfy a threshold if the value is greater than or equal to the threshold. In some other embodiments, a value may satisfy a threshold only if the value is less than a threshold. In some other embodiments, a value may satisfy a threshold if the value is less than or equal to the threshold.

At 208, the method may further include providing, by the controller at a time on the current day, a first output, based at least in part on a result of the determination as to whether the first characterization that is based at least in part on the portion of the traffic information that is associated with traffic from days prior to a current day satisfies a first criteria.

By providing, at a time on the current day, the first output based at least in part on a result of the determination as to whether the first characterization that is based at least in part on the portion of the traffic information that is associated with traffic from days prior to a current day satisfies a first criteria, it is possible to control the lighting on a current day based at least in part on traffic information associated with traffic from days prior to the current day.

In some embodiments, the controller may provide the first output if the first characterization satisfies the first criteria.

In some embodiments, the first output is to cause, at least in part, a lighting system to provide a first amount of illumination at a first time on the current day.

At used herein, the phrase "to cause" means "to cause directly" and/or "to cause indirectly". The phrase "to cause, at least in part" means "to cause" and/or "to cause in part" so as not to preclude the possibility that an output of the controller is not a sole cause but rather only one contributing cause.

In some embodiments, the first amount of illumination may be an increased amount of illumination (e.g., 100% of the illumination that is available from the lighting system 106).

In some embodiments, an "increased amount of illumination" may be an amount of illumination that is greater than an amount of illumination that is provided at a time that is not historically busy and not actually busy.

At 210, the method may further include determining, by the controller, a second characterization based at least in part on a portion of the traffic information that is associated with traffic from the current day.

In some embodiments, such portion of the traffic information may comprise traffic data indicative of traffic from the current day.

In some embodiments, the second characterization may comprise a value determined based at least in part on a relevant time or time interval of such data.

In some embodiments, the relevant time or time interval may be a time or time interval corresponding to a time of day for which the second characterization is being determined.

For example, referring again to FIG. 4, if the time of day is within time interval 1, the relevant time or time interval may be time interval 1 and the first characterization may be determined based at least in part on a current day traffic density, $d_{1,n}$, associated with time interval 1.

As will be further herein with respect to FIGS. 6-9, in some embodiments, the second characterization may be determined based at least in part on both: (i) a portion of the traffic information that is associated with traffic from days prior to a current day, and (ii) a portion of the traffic information that is associated with traffic from the current day.

In some of the latter embodiments, the second characterization may be determined as a weighted sum of: (i) historical traffic densities for a relevant time or time interval and (ii) a current day traffic density for the relevant time or time interval.

In some embodiments, the relevant time or time interval may be a time or time interval corresponding to a time of day for which the second characterization is being determined.

At 212, the method may further include determining, by the controller, whether the second characterization that is based at least in part on the portion of the traffic information associated with traffic from the current day satisfies a second criteria (which may be the same as or different from the first criteria).

In some embodiments, the above may comprise determining whether a value and/or other type of second characterization satisfies a second threshold and/or any other type of criteria.

In some embodiments, the second threshold may be the same as the first threshold.

At 214, the method may further include providing, by the controller at a time on the current day, a second output, based at least in part on a result of the determination as to whether the second characterization that is based at least in part on the portion of the traffic information associated with traffic from the current day satisfies a second criteria.

By providing, at a time on the current day, the second output, based at least in part on a result of the determination as to whether the second characterization that is based at least in part on the portion of the traffic information associated with traffic from the current day satisfies a second criteria, the method and/or system makes it is possible to control the lighting on a current day based at least in part on traffic information associated with traffic information associated with traffic from the current day.

In some embodiments, the controller may provide the second output if the second characterization satisfies the second criteria.

In some embodiments, the second output is to cause, at least in part, the lighting system to provide a second amount of illumination (which may be the same as or different from the first amount of illumination) at a second time on the current day.

In some embodiments, the second amount of illumination may be an increased amount of illumination (e.g., 100% of the illumination that is available from the lighting system 106).

As used herein, terms such as first and second do not require that the first be prior to the second.

In some embodiments, the method may further include providing, by a controller at a time on a current day, a third output to cause, at least in part, the lighting system to provide a third amount of illumination that is less than the first amount of illumination and less than the second amount of illumination.

In some embodiments, the third amount of illumination may be a reduced amount of illumination (e.g., 20% of the illumination that is available from the lighting system 106).

Thus, the method 200 and/or system 100 provides, at a time on the current day, a first output based at least in part on a result of the determination as to whether the first characterization that is based at least in part on the portion of the traffic information that is associated with traffic from days prior to a current day satisfies a first criteria.

The method 200 and/or system 100 further provides, at a time on the current day, the second output, based at least in part on a result of the determination as to whether the second characterization that is based at least in part on the portion of the traffic information associated with traffic from the current day satisfies a second criteria, The above make it possible to control the lighting on a current day based at least in part on traffic information associated with traffic from days prior to the current day and to control the lighting on a current day based at least in part on traffic information associated with traffic information associated with traffic from the current day, which thereby make it possible to better address the preference of many drivers (and/or pedestrians), to at least some degree, while conserving energy, and further enhancing safety.

In some embodiments, increased lighting may be provided at times that are historically busy (e.g., evening rush hours), even if such times are not busy on the current day, and at one or more times that are busy on the current day, even if they are not historically busy (i.e., non-rush hours).

Figure 5:
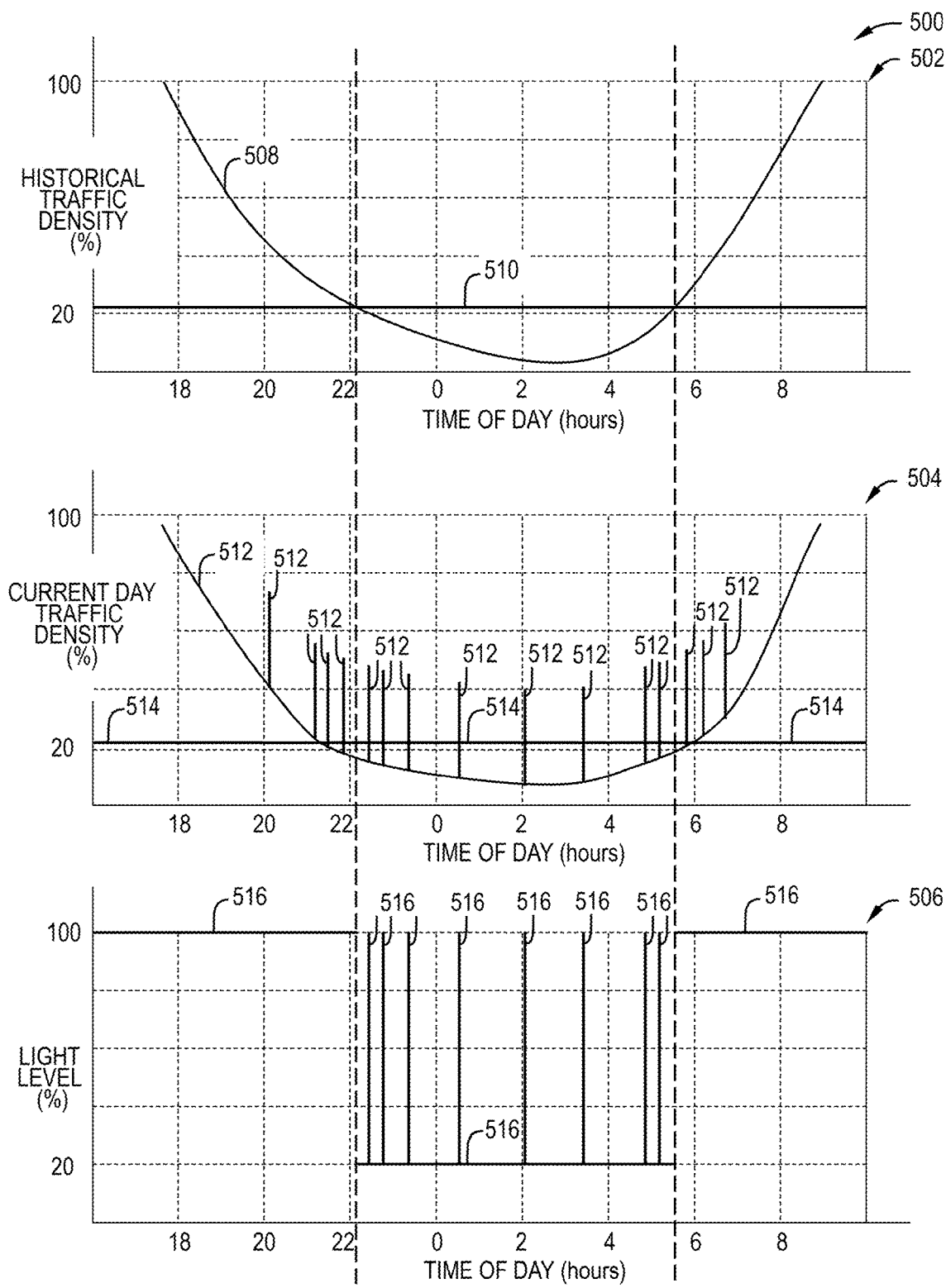
FIG. 5 is a graphical representation of operation of a controller, in accordance with some embodiments.

FIG. 5 is a graphical representation 500 of the operation of the controller 110, in accordance with some embodiments.

Referring to FIG. 5, in accordance with some embodiments, the graphical representation 500 includes three graphs 502, 504, 506.

The first graph 502 has two curves 508, 510. The first curve 508 shows a first characterization having the form of an average historical traffic density (e.g., as a percentage of a maximum traffic density) versus time of day. For example, the value of the average historical traffic density at 1800 hours is approximately 90%. The second curve 510 shows a first criteria in the form of a first threshold (e.g., expressed as a percentage of a maximum traffic density). For example, the first threshold may have a value of 22%.

As can be seen, the value of the average historical traffic density at 1800 hours is greater than the first threshold. The average historical traffic density remains greater than the first threshold until approximately 2210 hours, after which time it decreases below the first threshold. The average historical traffic density remains below the first threshold until approximately 0530, after which time it increases above the first threshold, where it remains until at least 0900.

The second graph 504 also has two curves 512, 514. The first curve 512 shows a second characterization having the form of a current day traffic density (e.g., as a percentage of a maximum traffic density) versus time of day on the current day. For example, the value of the current day traffic density at 1800 hours is approximately 86%. The second curve 514 shows a second criteria in the form of a second threshold (e.g., expressed as a percentage of a maximum traffic density). In some embodiments, the second threshold may have a value equal to that of the first threshold, e.g., 22%.

As can be seen, the value of the current day traffic density at 1800 hours is greater than the second threshold. The current day traffic density remains above the second threshold until approximately 2120 hours, after which time it decreases below the second threshold. Thereafter, the current day traffic density remains below the second threshold until approximately 2130 hours, after which time it spikes above the second threshold. Additional spikes occur at approximately 2150 hours, 2230 hours, 2250 hours, 2320 hours, 0030 hours, 0200 hours, 0330 hours, 0450 hours, 0510 hours, 0550 hours, 0610 hours and 0640 hours. At approximately 0600 hours, the current day traffic density increases above the second threshold, where it remains until at least 0900.

As used herein, the term "spike" means a rapid increase, which may be followed, often shortly thereafter, by a rapid decrease. Some spikes may last less than a minute. Some spikes may last from one to two minutes. Some spikes may last five minutes or longer.

The third graph 506 has one curve 516. The curve 516 shows the amount of illumination that the controller 110 causes the lighting system 106 to provide (e.g., as a percentage of a maximum available from the lighting system 106) versus time of day (on the current day).

In accordance with some embodiments, the controller 110 provides a first output at times (on the current day) at which the average historical traffic density satisfies (e.g., is greater than) the first threshold (or other first criteria).

In accordance with some embodiments, the first output is to cause, at least in part, the lighting system 106 to provide a first amount of illumination (which in accordance with some embodiments, will be an increased amount of illumination, e.g., 100% of the available illumination) at times (on the current day) at which the average historical traffic density satisfies (e.g., is greater than) the first threshold (or other first criteria).

Thus, the controller 110 provides a first output to cause, at least in part, the lighting system 106 to provide a first amount of illumination (which in accordance with some embodiments, will be an increased amount of illumination, e.g., 100% of the available illumination) from at least 1800 hours on the current day to approximately 2210 hours on the current day and from approximately 0530 hours on the current day to at least 900 hours on the current day.

As stated above, the providing of increased lighting at times that are historically busy (e.g., evening rush hours), even if such times are not busy on the current day, is sometimes referred to herein as a continuous mode.

In accordance with some embodiments, the controller 110 provides a second output at times (on the current day) at which the current day traffic density satisfies (e.g., is greater than) the second threshold (or other second criteria) and the average historical traffic density does not satisfy (e.g., is not greater than) the first threshold (or other first criteria).

In accordance with some embodiments, the second output is to cause, at least in part, the lighting system 106 to provide a second amount of illumination (which in accordance with some embodiments, will be an increased amount of illumination, e.g., 100% of the available illumination) at times (on the current day) at which the current day traffic density satisfies (e.g., is greater than) the second threshold (or other second criteria) and the average historical traffic density does not satisfy the first threshold (or other first criteria).

Thus, the controller 110 provides a second output to cause, at least in part, the lighting system 106 to provide a second amount of illumination (which in accordance with some embodiments, will be an increased amount of illumination, e.g., 100% of the available illumination) at approximately 2130 hours, 2150 hours, 2230 hours, 2250 hours, 2320 hours, 0030 hours, 0200 hours, 0330 hours, 0450 hours, 0510 hours, 0550 hours, 0610 hours and 0640 hours on the current day.

As stated above, the providing of increased lighting at one or more times that are busy on the current day, even if they are not historically busy (i.e., non-rush hours), is sometimes referred to herein as an adaptive mode.

In accordance with some embodiments, the controller 110 provides a third output at times (on the current day) at which the average historical traffic density does not satisfy the first threshold (or other first criteria) and the current day traffic density does not satisfy the second threshold (or other second criteria).

In accordance with some embodiments, the third output is to cause, at least in part, the lighting system 106 to provide a third amount of illumination (which in accordance with some embodiments, will be a decreased amount of illumination, e.g., 20% of the available illumination) at times (on the current day) at which the average historical traffic density does not satisfy the first threshold (or other first criteria) and the current day traffic density does not satisfy the second threshold (or other second criteria).

Thus, the system 100 is able to control the lighting on a current day based at least in part on traffic information associated with traffic from days prior to the current day and based at least in part on traffic information associated with traffic from the current day.

In doing so, the system 100 is able to address the preference of many drivers, to at least some degree, while conserving energy, and further enhancing safety.

Such control is made possible by providing, at a time on the current day, the first output based at least in part on a result of the determination as to whether the first characterization that is based at least in part on the portion of the traffic information that is associated with traffic from days prior to a current day satisfies a first criteria, and by providing, at a time on the current day, the second output, based at least in part on a result of the determination as to whether the second characterization that is based at least in part on the portion of the traffic information associated with traffic from the current day satisfies a second criteria.

In some embodiments, increased lighting may be provided at times that are historically busy (e.g., evening rush hours), even if such times are not busy on the current day, and at one or more times that are busy on the current day, even if they are not historically busy (i.e., non-rush hours).

As stated above, in some embodiments, the first characterization at 204 and the second characterization at 210 may each be determined based at least in part on both: (i) a portion of the traffic information that is associated with traffic from days prior to a current day, and (ii) a portion of the traffic information that is associated with traffic from the current day.

In some of the latter embodiments, the first characterization may be determined as a weighted sum of: (i) historical traffic densities for a relevant time or time interval and (ii) a current day traffic density for the relevant time or time interval.

The relevant time or time interval may be a time or time interval corresponding to a time of day for which the first characterization is being determined.

The second characterization may also be determined as a weighted sum of: (i) historical traffic densities for a relevant time or time interval and (ii) a current day traffic density for the relevant time or time interval.

The relevant time or time interval may be a time or time interval corresponding to a time of day for which the second characterization is being determined.

In some embodiments, the weighted sum may be defined as follows:

$$S_i = \sum_{j=1}^{n} w_{i,j} d_{i,j} \quad (1)$$

where $S_i$=characterization for an ith interval on an nth (current) day $w_{i,j}$=weight for the ith time interval on the jth day $d_{i,j}$=traffic density in the ith time interval on the jth day i=time interval j=day The time interval may be any length of time. In some embodiments, the length of the time interval represents a trade-off between processing time and response time. Longer time intervals may decrease the amount of processing but may also slow response time. Shorter time intervals may speed response time but may also increase the amount of processing. In some embodiments, the length of the time interval may be 1 minute, 5 minutes, 15 minutes or 1 hour.

The weights may be any weights. In some embodiments, if a time interval is not historically busy (e.g., non-rush hours), the weights for such time interval on days prior to the current day may be somewhat underweighted. To that effect, in some embodiments, if a time interval is not historically busy (e.g., non-rush hours), the weight for that time interval on the current day will usually be greater than the sum of the weights for such time interval on days prior to the current day:

$$w_{i,n} > \sum_{j=1}^{n-1} w_{i,j} \quad (2)$$

In some embodiments, this may facilitate a switch to increased lighting at a time that the traffic grows unexpectedly, even if the time is not historically busy (e.g., non-rush hours).

In some embodiments, if a time interval is historically busy (e.g., rush hours), the weights for such time interval on days prior to the current day may be somewhat overweighted. To that effect, in some embodiments, if a time interval is historically busy (e.g., rush hours), the weight for the time interval on the current day will usually be less than the sum of the weights for such time interval on days prior to the current day:

$$w_{i,n} < \sum_{j=1}^{n-1} w_{i,j} \quad (3)$$

In some embodiments, this may facilitate continuous, increased lighting, during a time that is historically busy, even if traffic is low at a moment.

In some embodiments, the sum of all weights may be equal to 1:

$$1 = \sum_{j=1}^{n} w_{i,j} \quad (4)$$

FIG. 6 is a graphical representation 600 of characterizations (each of which is in the form of a weighted sum) that may be determined for the times or time intervals shown in FIG. 4, in accordance with some embodiments.

Referring to FIG. 6, the graphical representation 400 includes a table having a plurality of entries 602-628. Each entry is associated with a single time or time interval and identifies the characterization (in the form of a weighted sum) for the time or time interval.

In some embodiments, each weighted sum may be determined in accordance with equation (1).

Figure 7:
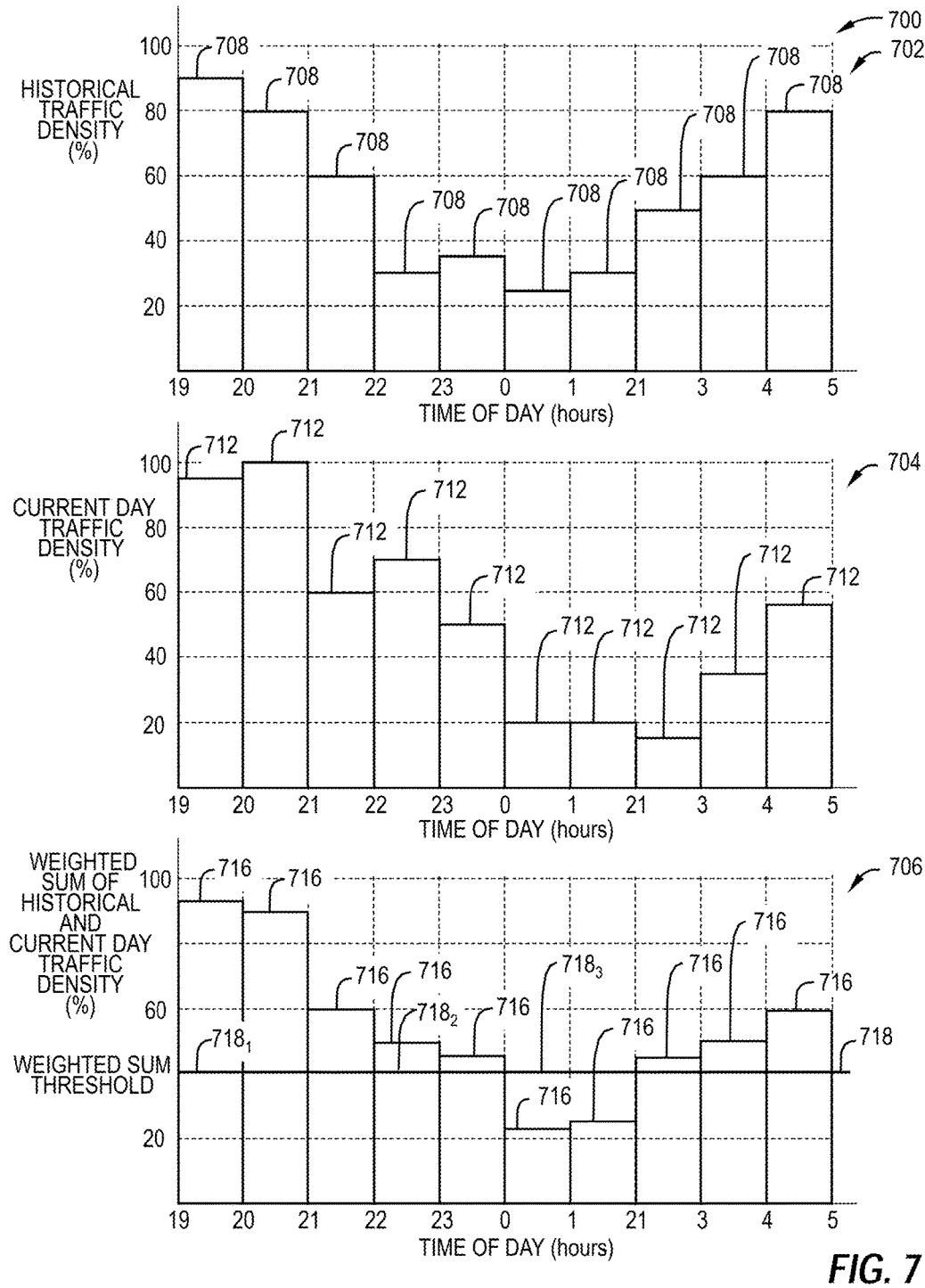
FIG. 7 is a graphical representation of operation of a controller, in accordance with some embodiments.

FIG. 7 is a graphical representation 700 of the operation of the controller 110, in accordance with some embodiments.

Referring to FIG. 7, the graphical representation 700 includes three graphs 702, 704, 706.

The first graph 702 includes a plurality of vertical bars 708 that show an average historical traffic density (e.g., as a percentage of a maximum traffic density) versus time of day. For example, the value of the average historical traffic density at 1900 hours is approximately 90%.

The second graph 704 includes a plurality of vertical bars 712 that show a current day traffic density (e.g., as a percentage of a maximum traffic density) versus time of day on the current day. For example, the value of the current day traffic density at 1900 hours is approximately 95%.

The third graph 706 includes a plurality of vertical bars 716 that show a series of characterizations (e.g., as a percentage of a maximum traffic density), each of which is determined as weighted sum of: (i) historical traffic densities and (ii) a current day traffic density for a respective time interval on a current day.

In some embodiments, each weighted sum may be determined in accordance with equation (1).

A first one of the vertical bars 716 shows a first characterization (which has a value of approximately 92%) determined as a weighted sum of: (i) historical traffic densities and (ii) a current day traffic density, for the time interval of 1900-2000 hours, which as can be seen, corresponds to an interval that is historically busy (relative to other intervals).

A fourth one of the vertical bars 716 shows a second characterization (which has a value of approximately 49%) determined as a weighted sum of: (i) historical traffic densities and (ii) a current day traffic density, for a time interval of 2200-2300 hours, which as can be seen, corresponds to an interval that is not historically busy (relative to other intervals).

A sixth one of the vertical bars 716 shows a third characterization (which has a value of approximately 22%) determined as a weighted sum of: (i) historical traffic densities and (ii) a current day traffic density, for a time interval of 0000-0100 hours, which as can be seen, corresponds to an interval that is not historically busy (relative to other intervals).

The third graph 706 further includes a curve 718 having a plurality of segments, e.g., $718_1$, $718_2$, $718_3$, each of which shows a threshold (e.g., expressed as a percentage of a maximum traffic density) for a respective one of the characterizations determined as a weighted sum of: (i) historical traffic densities and (ii) a current day traffic density.

A first segment $718_1$ shows a first threshold for the first characterization. In some embodiments, the first threshold may have a value of 40%.

A second segment $718_2$ shows a second threshold for the second characterization. In some embodiments, the second threshold may have a value equal to that of the first threshold, e.g., 40%.

A third segment $718_3$ shows a third threshold for the third characterization. In some embodiments, the third threshold may have a value equal to that of the first threshold and/or the second threshold, e.g., 40%.

In accordance with some embodiments, the controller 110 provides an output that causes, at least in part, the lighting system 106 to provide an amount of illumination that is an increased amount of illumination (e.g., 100% of the available illumination) at times (on the current day) at which a characterization satisfies (e.g., is greater than) a threshold for the characterization.

In accordance with some embodiments, the controller 110 provides an output that causes, at least in part, the lighting system 106 to provide an amount of illumination that is a decreased amount of illumination (e.g., 20% of the available illumination) at times (on the current day) at which a characterization does not satisfy (e.g., is not greater than) a threshold for the characterization.

As can be seen, the first characterization (which has a value of approximately 92%) is greater than the first threshold (e.g., which has a value of 40%) for the first characterization from 1900 hours on the current day to 2000 hours on the current day, which as can be seen, corresponds to an interval that is historically busy (relative to other intervals).

Thus, the controller 110 provides a first output that causes, at least in part, the lighting system 106 to provide a first amount of illumination (that is an increased amount of illumination, e.g., 100% of the available illumination) from 1900 hours on the current day to 2000 hours on the current day, which as can be seen, corresponds to an interval that is historically busy (relative to other intervals).

As can be seen, the second characterization (which has a value of approximately 49%) is greater than the second threshold (e.g., which has a value of 40%) for the second characterization from 2200 hours on the current day to 2300 hours on the current day, which as can be seen, corresponds to an interval that is not historically busy (relative to other intervals).

Thus, the controller 110 provides a second output that causes, at least in part, the lighting system 106 to provide a second amount of illumination (that is an increased amount of illumination, e.g., 100% of the available illumination) from 2200 hours on the current day to 2300 hours on the current day, which as can be seen, corresponds to an interval that is not historically busy (relative to other intervals).

As can be seen, the third characterization (which has a value of approximately 22%) is less than the third threshold (e.g., which has a value of 40%) for the third characterization from 0000 hours on the current day to 0100 hours on the current day, which as can be seen, corresponds to an interval that is not historically busy (relative to other intervals).

Thus, the controller 110 provides a third output that causes, at least in part, the lighting system 106 to provide a third amount of illumination (that is a decreased amount of illumination, e.g., 20% of the available illumination) from 0000 hours on the current day to 0100 hours on the current day, which as can be seen, corresponds to an interval that is not historically busy (relative to other intervals).

In some embodiments, the controller 110 may be configured to provide hysteresis in order to prevent small or other variations in the weighted sums (or other characterization(s)) from causing large changes in an amount of illumination provided by the lighting system 106.

Hysteresis may be provided in any manner(s). As further described below, in some embodiments, hysteresis may be provided, at least in part, via one or more additional thresholds (or other criteria).

Figure 8:
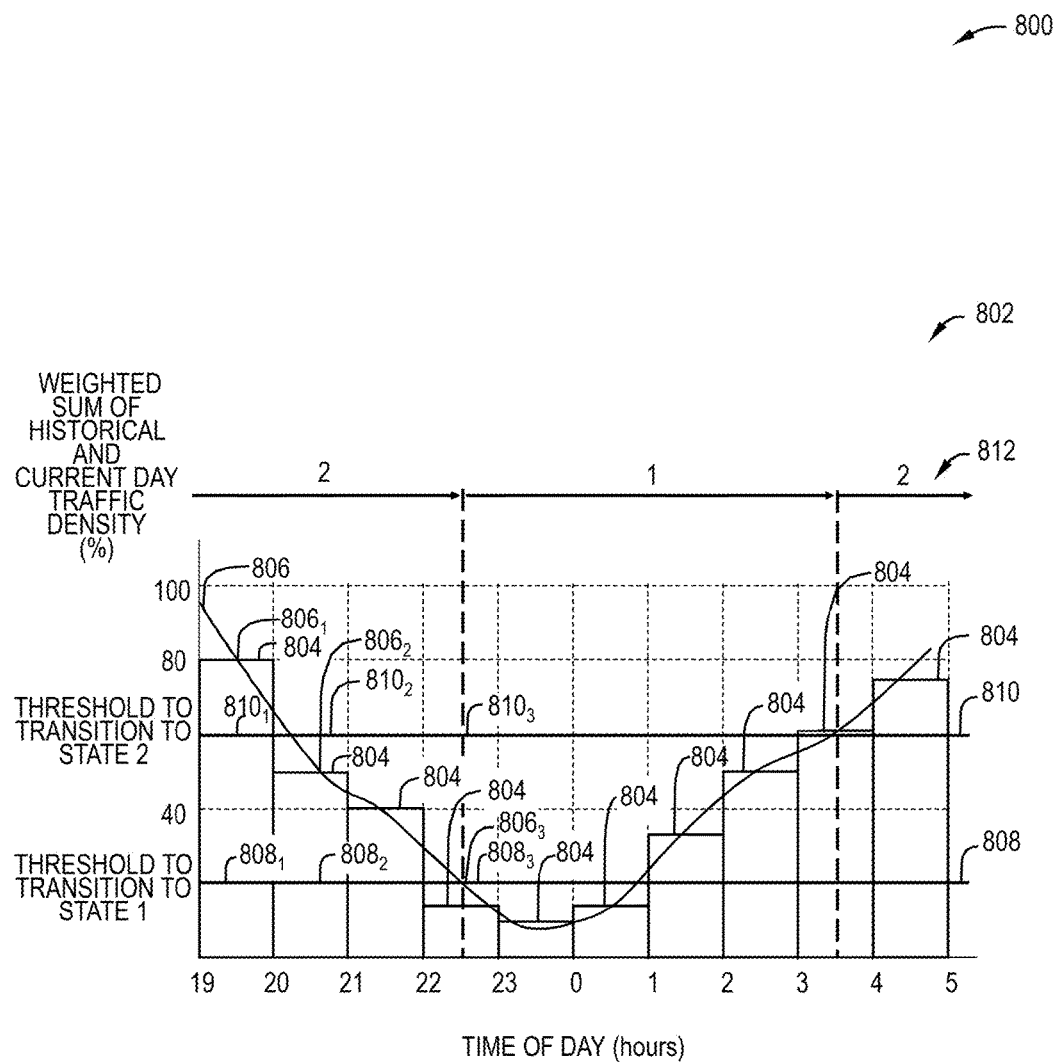
FIG. 8 is a graphical representation of operation of a controller, in accordance with some embodiments.

FIG. 8 is a graphical representation of the operation of the controller 110, in accordance with some embodiments, in which hysteresis is provided, at least in part, via one or more additional thresholds.

Referring to FIG. 8, the graphical representation includes a graph 802.

The graph 802 includes a plurality of vertical bars 804 that show a series of characterizations (e.g., as a percentage of a maximum traffic density), each of which is determined as a weighted sum of: (i) historical traffic densities and (ii) a current day traffic density for a respective interval on a current day.

In some embodiments, each weighted sum may be determined in accordance with equation (1).

The graph 802 further includes four curves 806, 808, 810, 812. The first curve 806 shows characterizations (e.g., as a percentage of a maximum traffic density) that are based at least in part on a weighted sum of: (i) historical traffic densities and (ii) a current day traffic density for a respective interval on a current day.

In some embodiments, the characterizations shown in the first curve 806 may be determined by low pass filtering (or other filtering of) the series of characterizations that are shown by the plurality of vertical bars 804.

In some embodiments, the characterizations shown in the first curve 806 may be determined as a weighted sum of: (i) historical traffic densities and (ii) a current day traffic density for time intervals that are 1 minute in length or otherwise short compared to the time intervals of the characterizations shown by the vertical bars 804.

For example, the first curve 806 shows a first characterization $806_1$ (which has a value of approximately 80%) at 1930 hours, a second characterization $806_2$ (which has a value of approximately 50%) at 2030 hours, and a third characterization $806_3$ (which has a value of approximately 19.9%) at 2230 hours.

The second curve 808 has a plurality of segments, e.g., $808_1$, $808_2$, $808_3$, each of which shows a threshold (e.g., expressed as a percentage of a maximum traffic density) for a respective one of the characterizations, to cause a transition to a first state.

A first segment $808_1$ shows a first threshold (e.g., which may have a value of 20%) for the first characterization to cause a transition to the first state.

A second segment $808_2$ shows a second threshold for the second characterization to cause a transition to the first state. In some embodiments, the second threshold may have a value equal to that of the first threshold, e.g., 20%.

A third segment $808_3$ shows a third threshold for the third characterization to cause a transition to the first state. In some embodiments, the third threshold may have a value equal to that of the first threshold and/or the second threshold, e.g., 20%.

The third curve 810 has a plurality of segments, e.g., $810_1$, $810_2$, $810_3$, each of which shows a threshold (e.g., expressed as a percentage of a maximum traffic density) for a respective one of the plurality of characterizations to cause a transition to the second state.

A first segment $810_1$ shows a fourth threshold (e.g., which may have a value of 60%) for the first characterization to cause a transition to the second state.

A second segment $810_2$ shows a fifth threshold for the second characterization to cause a transition to the second state. In some embodiments, the second threshold may have a value equal to that of the first threshold, e.g., 60%.

A third segment $810_3$ shows a sixth threshold for the third characterization to cause a transition to the second state. In some embodiments, the third threshold may have a value equal to that of the first threshold and/or the second threshold, e.g., 60%.

The fourth curve 812 shows a state of the controller 110 versus time of day. For example, in the illustrated embodiment, the controller 110 is in the second state at 1900 hours.

In accordance with some embodiments, if the controller is in a first state, the controller remains in the first state until a characterization satisfies (e.g., is greater than) a threshold (or other criteria) for the characterization to cause a transition to the second (or some other) state. In the first state, the controller 110 provides an output that causes, at least in part, the lighting system 106 to provide a decreased amount of illumination (e.g., 20% of the available illumination).

In accordance with some embodiments, if the controller is in the second state, the controller remains in the second state until a characterization satisfies (e.g., is less than) a threshold (or other criteria) for the characterization to cause a transition to the first (or some other) state. In the second state, the controller 110 provides an output that causes, at least in part, the lighting system 106 to provide an increased amount of illumination (e.g., 100% of the available illumination).

As can be seen, the controller is in the second state at 1900 hours. The first characterization $806_1$ (which has a value of approximately 80%) at 1930 hours is greater than the first threshold (e.g., which has a value of 20%) for the first characterization to cause a transition to the first state, and thus does not satisfy a first criteria to cause a transition to the first state.

As a result, the controller 110 provides a first output that causes, at least in part, the lighting system 106 to provide a first amount of illumination (which in accordance with some embodiments, will be an increased amount of illumination, e.g., 100% of the available illumination) at 1930 hours on the current day.

As can be seen, the second characterization $806_2$ (which has a value of approximately 50%) at 2030 hours is greater than the second threshold (e.g., which has a value of 20%) for the second characterization to cause a transition to the first state, and thus does not satisfy a second criteria to cause a transition to the first state.

As a result, the controller 110 provides a second output that causes, at least in part, the lighting system 106 to provide a second amount of illumination (which in accordance with some embodiments, will be an increased amount of illumination, e.g., 100% of the available illumination) at 2030 hours on the current day.

The third characterization $806_3$ (which has a value of approximately 19.9%) at 2230 hours is less than the second threshold (e.g., which has a value of 20%) for the third characterization to cause a transition to the first state, and thus satisfies a third criteria to cause a transition to the first state.

As a result, the controller 110 provides a third output that causes the lighting system 106 to provide a third amount of illumination (which in accordance with some embodiments, will be a decreased amount of illumination, e.g., 20% of the available illumination) at 2230 hours on the current day.

Hysteresis may be provided in any amount(s). In some embodiments, the amount of hysteresis may be less than or greater than the amount in shown in FIG. 8. In some embodiments, the amount of hysteresis may be based at least in part on any weights that may be employed.

Figure 9:
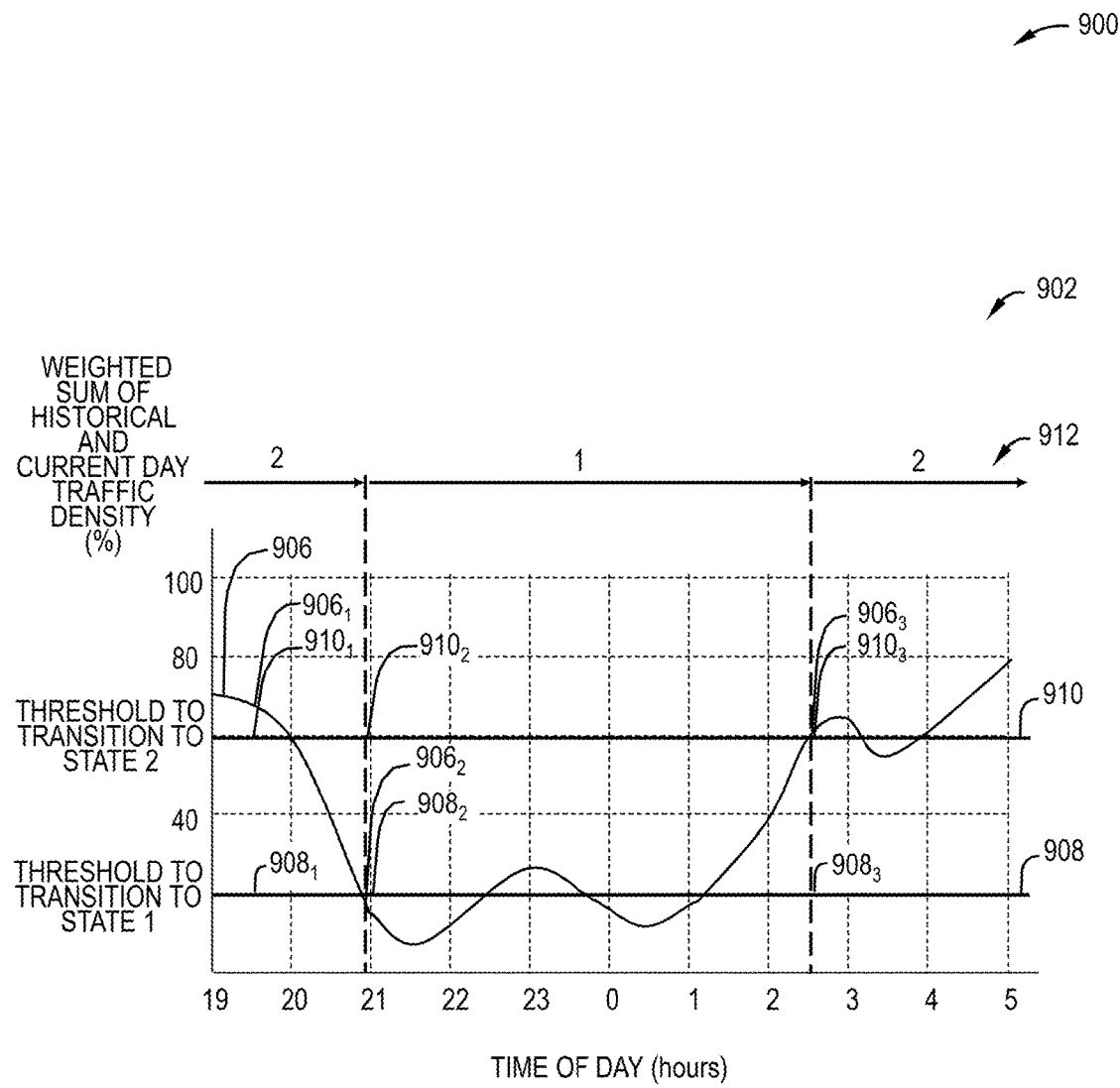
FIG. 9 is a graphical representation of operation of a controller, in accordance with some embodiments.

FIG. 9 is a another graphical representation of the operation of the controller 110, in accordance with some embodiments, in which hysteresis is provided, at least in part, via one or more additional thresholds.

Referring to FIG. 9, the graphical representation includes a graph 902.

The graph 902 includes four curves 906, 908, 910, 912. The first curve 906 show a series of characterizations (e.g., as a percentage of a maximum traffic density), each of which is based at least in part on a weighted sum of: (i) historical traffic densities and (ii) a current day traffic density for a respective interval on a current day.

In some embodiments, the characterizations are determined by low pass filtering (or other filtering of) the series of characterizations that are shown by the plurality of vertical bars 804.

In some embodiments, the characterizations are determined as a weighted sum of: (i) historical traffic densities and (ii) a current day traffic density for time intervals that are 1 minute in length or otherwise short compared to the time intervals of the characterizations shown by the vertical bars in FIGS. 7-8.

In some embodiments, each weighted sum may be determined in accordance with equation (1).

For example, the first curve 906 shows a first characterization $906_1$ (which has a value of approximately 68%) at 1930 hours, a second characterization $906_2$ (which has a value of approximately 19.9%) at 2055 hours, and a third characterization $906_3$ (which has a value of approximately 60.1%) at 0230 hours.

The second curve 908 has a plurality of segments, e.g., $908_1$, $908_2$, $908_3$, each of which shows a threshold (e.g., expressed as a percentage of a maximum traffic density) for a respective one of the characterizations, to cause a transition to a first state.

A first segment 908₁ shows a first threshold (which may have a value of 20%) for the first characterization to cause a transition to the first state.

A second segment 908₂ shows a second threshold for the second characterization to cause a transition to the first state. In some embodiments, the second threshold may have a value equal to that of the first threshold, e.g., 20%.

The third curve 910 has a plurality of segments, e.g., 910₁, 910₂, 910₃, each of which shows a threshold (e.g., expressed as a percentage of a maximum traffic density) for a respective one of the plurality of characterizations to cause a transition to the second state.

A third segment 910₃ shows a third threshold (which may have a value of 60%) for the third characterization to cause a transition to the second state.

The fourth curve 912 shows a state of the controller 110 versus time of day. For example, in the illustrated embodiment, the controller 110 is in the second state at 1900 hours.

In accordance with some embodiments, if the controller is in a first state, the controller remains in the first state until a characterization satisfies (e.g., is greater than) a threshold (or other criteria) for the characterization to cause a transition to the second (or some other) state. In the first state, the controller 110 provides an output that causes, at least in part, the lighting system 106 to provide a decreased amount of illumination (e.g., 20% of the available illumination).

In accordance with some embodiments, if the controller is in the second state, the controller remains in the second state until a characterization satisfies (e.g., is less than) a threshold (or other criteria) for the characterization to cause a transition to the first (or some other) state. In the second state, the controller 110 provides an output that causes, at least in part, the lighting system 106 to provide an increased amount of illumination (e.g., 100% of the available illumination).

As can be seen, the controller is in the second state at 1900 hours. The first characterization 906₁ (which has a value of approximately 68%) at 1930 hours is greater than the first threshold (e.g., which has a value 20%) for the first characterization to cause a transition to the first state, and thus does not satisfy a first criteria to cause a transition to the first state.

As a result, the controller 110 provides a first output that causes, at least in part, the lighting system 106 to provide a first amount of illumination (which in accordance with some embodiments, will be an increased amount of illumination, e.g., 100% of the available illumination) at 1930 hours on the current day.

As can be seen, the second characterization 906₂ (which has a value of approximately 19.9%) at 2055 hours is less than the second threshold (e.g., which has a value of 20%) for the second characterization to cause a transition to the first state, and thus satisfies a second criteria to cause a transition to the first state.

As a result, the controller 110 provides a second output that causes, at least in part, the lighting system 106 to provide a second amount of illumination (which in accordance with some embodiments, will be a decreased amount of illumination, e.g., 20% of the available illumination) at 2055 hours on the current day.

As can be seen, the third characterization 906₃ (which has a value of approximately 60.1%) at 0230 hours is greater than the third threshold (e.g., which has a value of 60%) for the third characterization to cause a transition to the second state, and thus satisfies a third criteria to cause a transition to the second state.

As a result, the controller 110 provides a third output that causes, at least in part, the lighting system 106 to provide a third amount of illumination (which in accordance with some embodiments, will be an increased amount of illumination, e.g., 100% of the available illumination) at 0230 hours on the current day.

In some embodiments, the amount of hysteresis may be less than or greater than the amount in shown in FIG. 9.

In some embodiments, one or more embodiments of one or more portions of the system 100 may be disposed in a street light or other type of light fixture.

Figure 10:
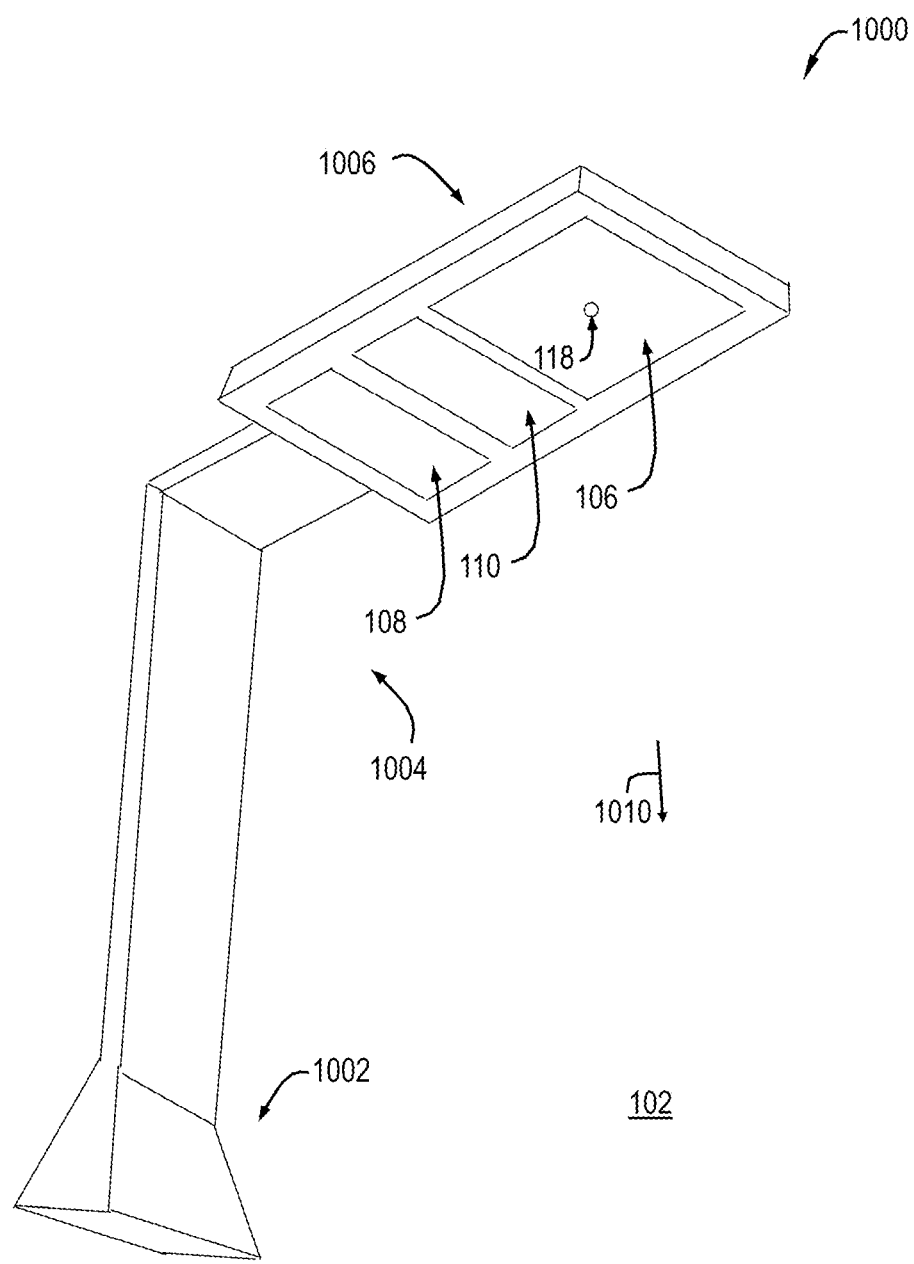
FIG. 10 is a perspective view of a light fixture, in accordance with some embodiments.

FIG. 10 is a perspective view of a light fixture 1000 that includes one or more embodiments of the lighting system 106, in accordance with some embodiments.

Referring to FIG. 10, in accordance with some embodiments, the light fixture 1000 may include a base 1002, a pole 1004 or other type of support coupled to the base 1002, and a head 1006 coupled to the support 1004.

The head 1006 includes one or more embodiments of the lighting system 106.

In operation, the lighting system 106 produces light, represented by a light ray 1010, which may be used in illuminating the area 102, e.g., a portion of a street, In some embodiments, the lighting system 106 is manufactured, shipped and/or sold separately from the rest of the light fixture 1000.

In some embodiments, the controller 110 and/or the traffic sensor 108 may also be disposed in the light fixture 1000.

Although one lighting system 106, one traffic sensor 108, one controller 110 and one area 102 to be illuminated are shown in the system 100, it should be understood that the system 100 may include any number of lighting systems, any number of traffic sensors, any number of controllers and any number of one areas to be illuminated, any one or more of which may include one or more embodiments (or portion(s) thereof) disclosed herein.

In some embodiments, the system 100 may include a plurality of light fixtures 1000 disposed in an area 102 to be illuminated, e.g., a portion of a street.

Figure 11:
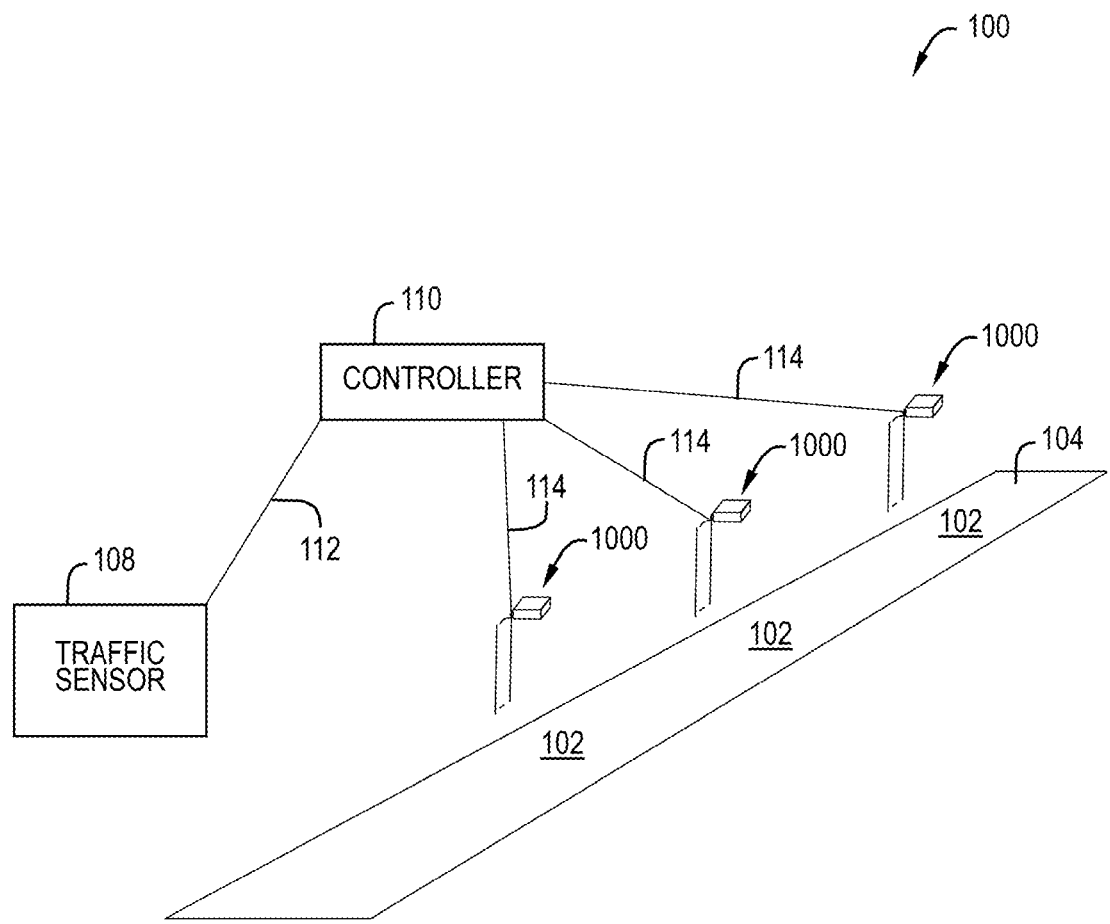
FIG. 11 is a perspective view of the system, in accordance with some embodiments.

FIG. 11 is a perspective view of the system 100, in accordance with some embodiments.

Referring to FIG. 11, in accordance with some embodiments, the system 100 may include a plurality of light fixtures 1000 disposed in the area 102 to be illuminated, e.g., a portion of a street.

In some embodiments, the controller 110 may be coupled to each of the fixtures 1000.

In some embodiments, each fixture 1000 may include its own traffic sensor and/or its own controller 110.

Figure 12:
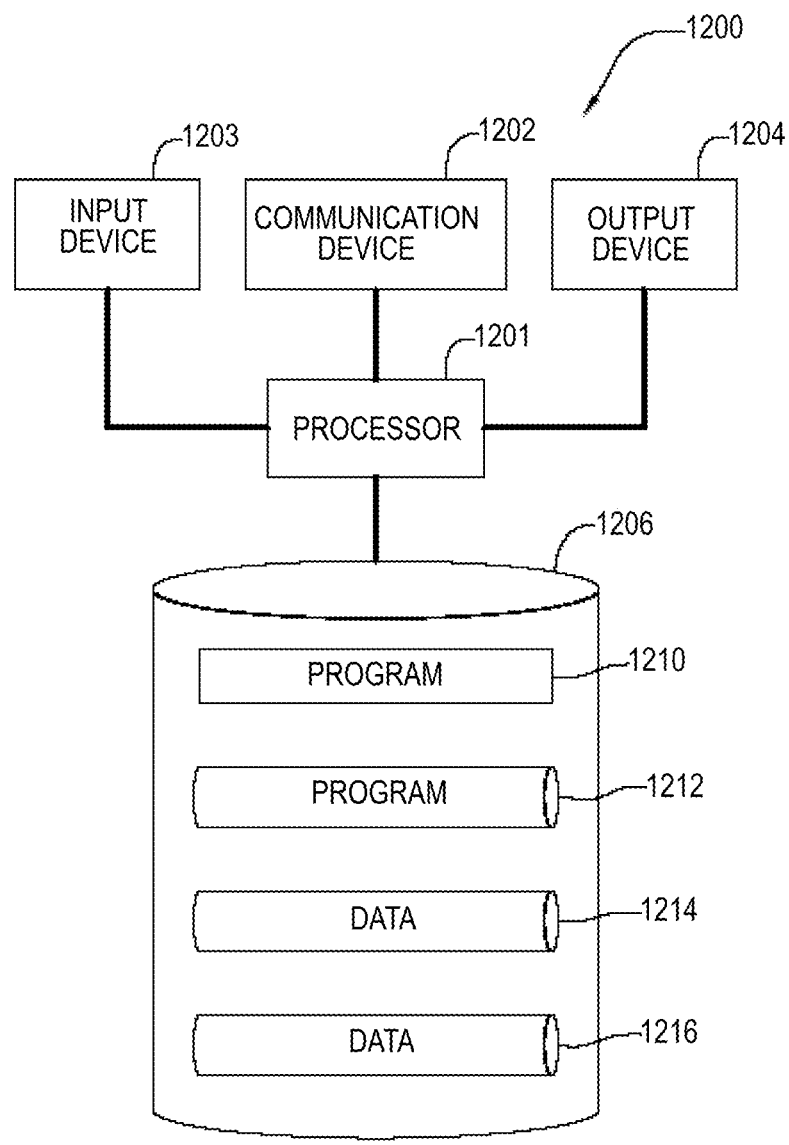
FIG. 12 is a block diagram of an architecture, in accordance with some embodiments.

FIG. 12 is a block diagram of an architecture 1200 according to some embodiments. In some embodiments, one or more of the systems (or portion(s) thereof) and/or devices (or portion(s) thereof) disclosed herein may have an architecture that is the same as and/or similar to one or more portions of the architecture 1200.

In some embodiments, one or more of the methods (or portion(s) thereof) disclosed herein may be performed by a system, apparatus and/or device having an architecture that is the same as or similar to the architecture 1200 (or portion(s) thereof).

The architecture may be implemented as a distributed architecture or a non-distributed architecture. A distributed architecture may be a completely distributed architecture or a partly distributed-partly non distributed architecture.

Referring to FIG. 12, in accordance with some embodiments, the architecture 1200 includes a processor 1201 operatively coupled to a communication device 1202, an input device 1203, an output device 1204 and a storage device 1206, each of which may be distributed or non-distributed.

In some embodiments, the processor 1201 may execute processor-executable program code to provide one or more portions of the one or more disclosed herein and/or to carry out one or more portions of one or more embodiments of one or more methods disclosed herein.

In some embodiments, the processor 1201 may include one or more microprocessors, such as, for example, one or more "general-purpose" microprocessors, one or more special-purpose microprocessors and/or application specific integrated circuits (ASICS), or some combination thereof. In some embodiments, the processor 1201 may include one or more reduced instruction set (RISC) processors.

The communication device 1202 may be used to facilitate communication with other devices and/or systems. In some embodiments, communication device 1202 may be configured with hardware suitable to physically interface with one or more external devices and/or network connections. For example, communication device 1202 may comprise an Ethernet connection to a local area network through which architecture 1200 may receive and transmit information over the Internet and/or one or more other network(s).

The input device 1203 may comprise, for example, one or more devices used to input data and/or other information, such as, for example: a keyboard, a keypad, track ball, touchpad, a mouse or other pointing device, a microphone, knob or a switch, an infra-red (IR) port, etc. The output device 1204 may comprise, for example, one or more devices used to output data and/or other information, such as, for example: an IR port, a display, a speaker, and/or a printer, etc.

In some embodiments, the input device 1203 and/or output device 1204 define a user interface, which may enable an operator to input data and/or other information and/or to view output data and/or other information.

The storage device 1206 may comprise, for example, one or more storage devices, such as, for example, magnetic storage devices (e.g., magnetic tape and hard disk drives), optical storage devices, and/or semiconductor memory devices such as Random Access Memory (RAM) devices and Read Only Memory (ROM) devices.

The storage device 1206 may store one or more programs 1210-1212 and/or other information for operation of the architecture 1200. In some embodiments, the one or more programs 1210-1212 include one or more instructions to be executed by the processor 1201 to provide one or more portions of one or more tasks and/or one or more portions of one or more methods disclosed herein. In some embodiments, the one or more programs 1210-1212 include one or more operating systems, database management systems, other applications, other information files, etc., for operation of the architecture 1200.

The storage device 1206 may store one or more databases and/or other information 1214-1216 for one or more programs. As used herein a "database" may refer to one or more related or unrelated databases. Data and/or other information may be stored in any form. In some embodiments, data and/or other information may be stored in raw, excerpted, summarized and/or analyzed form.

In some embodiments, one or more portions of one or more embodiments disclosed herein may be embodied in a method, an apparatus, a system, a computer program product, and/or a non-transitory machine readable storage medium with instructions stored thereon. As used herein, a machine may be any type of machine. In some embodiments, a machine comprises a processor.

Unless stated otherwise, a processor may comprise any type of processor. For example, a processor may be programmable or non-programmable, general purpose or special purpose, dedicated or non-dedicated, distributed or non-distributed, shared or not shared, and/or any combination thereof. A processor may include, but is not limited to, hardware, software (e.g., low level language code, high language code, microcode), firmware, and/or any combination thereof. Hardware may include, but is not limited to off the shelf integrated circuits, custom integrated circuits and/or any combination thereof. In some embodiments, a processor comprises a microprocessor. Software may include, but is not limited to, instructions that are storable and/or stored on a computer readable medium, such as, for example, magnetic or optical disk, magnetic or optical tape, CD-ROM, DVD, RAM, EPROM, ROM or other semiconductor memory. A processor may employ continuous signals, periodically sampled signals, and/or any combination thereof. If a processor is distributed, two or more portions of the processor may communicate with one another through a communication link.

Unless stated otherwise, the term "processor" should be understood to include one processor or two or more cooperating processors.

Unless stated otherwise, the term "memory" should be understood to encompass a single memory or storage device or two or more memories or storage devices.

Unless stated otherwise, a processing system is any type of system that includes at least one processor.

Unless stated otherwise, a controller may comprise any type of controller. A controller may include one or more processors. If a controller is distributed, two or more portions of the controller may communicate with one another through a communication link.

Unless stated otherwise, the term "controller" should be understood to include one controller or two or more cooperating controllers.

Unless stated otherwise, a "link" may comprise any type(s) of link(s), for example, but not limited to, wired links (e.g., conductors, fiber optic cables) or wireless links (e.g., acoustic links, microwave links, satellite links, infrared links or other electromagnetic links) or any combination thereof, each of which may be public and/or private, dedicated and/or shared. In some embodiments, a link may comprise wiring, circuitry and/or socket(s). A link may support transmission of information and/or power. Information may be of any type and in any form, for example, but not limited to, analog and/or digital in serial and/or in parallel form. Information may or may not be divided into blocks. A link that supports transmission of information may employ a communication protocol or combination of communication protocols including, for example, but not limited to the Internet Protocol. Power may also be of any type and in any form, for example, but not limited to, direct current (DC) power, alternating current (AC) power and/or modulated (e.g., pulse width modulated) power.

Unless otherwise stated, terms such as, for example, "in response to" and "based on" mean "in response at least to" and "based at least on", respectively, so as not to preclude being responsive to and/or based on, more than one thing.

Unless stated otherwise, terms such as, for example, "comprises", "has", "includes", and all forms thereof, are considered open-ended, so as not to preclude additional elements and/or features. In addition, unless stated otherwise, terms such as, for example, "a", "one", "first", are considered open-ended, and do not mean "only a", "only one" and "only a first", respectively. Moreover, unless stated otherwise, the term "first" does not, by itself, require that there also be a "second".

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A system comprising:
a control processor in communication across a link with a traffic sensor and a lighting system;
the traffic sensor configured to sense traffic flow in a detection area and to provide data indicative of the traffic flow information to the control processor;
the control processor configured to execute instruction that cause the control processor to:
receive the traffic flow information;
determine a first characterization based at least in part on a portion of the traffic flow information that is associated with traffic from days prior to a current day;
determine whether the first characterization satisfies a first criteria;
provide at a time on the current day, a first output to the lighting system, the first output based at least in part on a result of the determination;
determine a second characterization based at least in part on a portion of the traffic flow information that is associated with traffic from the current day;
determine whether the second characterization satisfies a second criteria;
provide at a time on the current day, a second output to the lighting system, the second output, based at least in part on a result of the determination; and
the lighting system configured to provide at least a first amount of illumination based on the first output, and a second amount of illumination based on the second output, the first amount and the second amount of illumination being different amounts of illumination.

2. The system of claim 1,
the lighting system configured to provide the first amount of illumination at a first time on the current day; and
the lighting system configured to provide the second amount of illumination at a second time on the current day.

3. The system of claim 1, wherein the executable instructions cause the control processor to:
provide a third output, to cause, at least in part, the lighting system to provide a third amount of illumination that is less than the first amount of illumination and less than the second amount of illumination at a third time on the current day.

4. The system of claim 1, the lighting system including a light fixture, and at least one of the control processor and the traffic sensor disposed in the light fixture.

5. The system of claim 1, the traffic sensor including at least one of a motion detector, an acoustic sensor, an electromagnetic sensor, an occupancy sensor, an image processor, a vehicle detection loop, and an air filled hose.

6. The system of claim 1, the detection area located one of upstream of, spaced apart from, adjacent to, and overlapping an area illuminated by the lighting system.

7. The system of claim 1, the first characterization is based at least in part on: (i) a portion of the traffic flow information that is associated with traffic from days prior to a current day, and (ii) a portion of the traffic flow information that is associated with traffic from the current day; and
the second characterization is based at least in part on: (i) a portion of the traffic flow information that is associated with traffic from days prior to a current day, and (ii) a portion of the traffic flow information that is associated with traffic from the current day.

8. The system of claim 7, the first characterization is determined as a weighted sum; and
the second characterization is determined as a weighted sum.

9. The system of claim 1, the lighting system configured to illuminate an area on a current day based at least in part on the traffic flow information associated with traffic from one or more day prior to the current day.

10. A method comprising:
sensing by a traffic sensor traffic flow in a detection area;
the traffic sensor providing traffic information via a link to a control processor, the traffic flow information indicative of traffic flow data;
receiving, in the control processor, the traffic information from the traffic sensor;
determining, by the control processor, a first characterization based at least in part on a portion of the traffic information that is associated with traffic from days prior to a current day;
determining, by the control processor, whether the first characterization satisfies a first criteria;
providing, by the control processor, at a time on the current day, a first output to a lighting system via a link, the first output based at least in part on a result of the determination;
determining, by the control processor, a second characterization based at least in part on a portion of the traffic information that is associated with traffic from the current day;
determining, by the control processor, whether the second characterization satisfies a second criteria;
providing, by the control processor, at a time on the current day, a second output to the lighting system via the link, the second output, based at least in part on a result of the determination; and
the lighting system providing at least a first amount of illumination based on the first output, and a second amount of illumination based on the second output, the first amount and the second amount of illumination being different amounts of illumination.

11. The method of claim 10,
the lighting system providing the first amount of illumination at a first time on the current day; and
the lighting system providing the second amount of illumination at a second time on the current day.

12. The method of claim 11, further comprising:
providing a third output to cause, at least in part, the lighting system to provide a third amount of illumination that is less than the first amount of illumination and less than the second amount of illumination at a third time on the current day.

13. The method of claim 10, the first characterization is based at least in part on: (i) a portion of the traffic information that is associated with traffic from days prior to a current day, and (ii) a portion of the traffic information that is associated with traffic from the current day; and
the second characterization is based at least in part on: (i) a portion of the traffic information that is associated with traffic from days prior to a current day, and (ii) a portion of the traffic information that is associated with traffic from the current day.

14. The method of claim 13, the first characterization is determined as a weighted sum; and the second characterization is determined as a weighted sum.

15. A non-transitory computer readable medium having code stored thereon, the code being executable by a control processor to cause the control processor to perform a method comprising:

receiving, in the control processor, traffic information provided across a link by a traffic sensor, the traffic information indicative of traffic flow data in a detection area;

determining, by the control processor, a first characterization based at least in part on a portion of the traffic information that is associated with traffic from days prior to a current day;

determining, by the control processor, whether the first characterization satisfies a first criteria;

providing, by the control processor, at a time on the current day, a first output to a lighting system via a link, the first output based at least in part on a result of the determination;

determining, by the control processor, a second characterization based at least in part on a portion of the traffic information that is associated with traffic from the current day;

determining, by the control processor, whether the second characterization satisfies a second criteria;

providing, by the control processor, at a time on the current day, a second output to a lighting system via a link, the second output based at least in part on a result of the determination; and the lighting system providing at least a first amount of illumination based on the first output, and a second amount of illumination based on the second output, the first amount and the second amount of illumination being different amounts of illumination.

16. The medium of claim 15, the code causing the control processor to perform the method, including the lighting system providing the first amount of illumination at a first time on the current day; and the lighting system providing the second amount of illumination at a second time on the current day.

17. The medium of claim 16, the code causing the control processor to perform the method, including:

providing a third output to the lighting system; and the lighting system providing a third amount of illumination that is less than the first amount of illumination and less than the second amount of illumination at a third time on the current day.

18. The medium of claim 15, the first characterization is based at least in part on: (i) a portion of the traffic information that is associated with traffic from days prior to a current day, and (ii) a portion of the traffic information that is associated with traffic from the current day; and the second characterization is based at least in part on: (i) a portion of the traffic information that is associated with traffic from days prior to a current day, and (ii) a portion of the traffic information that is associated with traffic from the current day.

19. The method of claim 15, the first characterization is determined as a weighted sum; and the second characterization is determined as a weighted sum.

* * * * *